United States Patent
Clark

[15] 3,698,814
[45] Oct. 17, 1972

[54] ABERRATION-FREE COMPENSATOR FOR USE IN WHITE LIGHT INTERFEROMETRY

[72] Inventor: John B. Clark, 3203 Runkle Street, Niles, Mich. 49120

[22] Filed: Jan. 25, 1971

[21] Appl. No.: 109,167

[52] U.S. Cl. .................356/107, 350/168, 350/312
[51] Int. Cl. ...............................................G01b 9/02
[58] Field of Search ...............356/107; 350/168, 312

[56] References Cited

UNITED STATES PATENTS

| | | | |
|---|---|---|---|
| 2,668,471 | 2/1954 | Benzinger et al. | 356/107 |
| 2,821,881 | 2/1958 | Svensson | 356/107 |
| 2,851,920 | 9/1958 | Svensson | 356/107 |
| 3,035,482 | 5/1962 | Kinder | 356/107 |
| 3,064,527 | 11/1962 | Bartels | 356/107 |
| 3,450,476 | 6/1969 | Rando | 356/107 |
| 3,472,598 | 10/1969 | Hossman | 356/107 |

*Primary Examiner*—William L. Sikes
*Attorney*—E. Manning Giles, J. Patrick Cagney, Michael A. Kondzella and Richard A. Zachar

[57] ABSTRACT

An aberration-free compensator for use in white light interferometry is provided in which anomalous fringe shifts characteristic of the difference in refractive dispersion between the two limbs of the interferometer are eliminated. The compensator is designed so that the sole difference in light paths through the compensator elements in the two limbs of the interferometer is through a fluid medium having a refractive dispersion which is substantially identical to that of the material being studied in the interferometer. Use of such a fluid medium compensator permits changing the refractive dispersion thereof without substantially rebuilding the interferometer.

7 Claims, 7 Drawing Figures

INVENTOR
JOHN B. CLARK
BY Michael A. Kondzella
ATTORNEY

ABERRATION-FREE COMPENSATOR FOR USE IN WHITE LIGHT INTERFEROMETRY

BACKGROUND OF THE INVENTION

This invention relates to an improved compensator for use in white light interferometry. In one of its more particular aspects this invention relates to a compensator in which the problem of anomalous fringe shifts is eliminated instrumentally.

The art of interferometry provides techniques to determine differences between refractive indices or thicknesses of fluids and transparent solids by measuring the difference in the path length of light between the two limbs of an interferometer, one limb containing the unknown, that is, the material upon which the determination is to be conducted and the other limb containing a reference material, the refractive index or thickness of which is known.

In the Rayleigh interferometer, for example, shown in a schematic plan view in FIG. 1, white light from a source 10 is passed through a narrow vertical slit 11, collimated by a lens 12 and passed in parallel beams through two vertical slits 13 and 14 which divide the light beam into two beams, one of which passes through a cell 15 containing a reference material, the other passing through a cell 16 containing the unknown. The emergent beams from the reference and unknown cells are then passed through compensators 17 and 18, respectively, recombined by passing through collimating lens 19 and focused upon ocular cylinder lens 20 forming interference fringes upon recombination. These interference fringes can be viewed directly by means of the cylindrical ocular lens or in the focal plane of a telescope (not shown) or in the focal plane of a camera (not shown) depending upon the particular use of which the measurement is to be put. In conducting a measurement with the Rayleigh interferometer it has been customary to use a compensator for equalizing the light paths in the two limbs of the interferometer. One convenient method for accomplishing this result has been to align the interference fringes with respect to a null fringe pattern which is produced by a portion of the light beam which does not pass through those portions of the cells which contain the materials being studied but instead passes through identical paths in both limbs. Upon placing the same material in both the reference and unknown cell and aligning the interference fringes thereby produced with respect to the null fringe pattern by appropriate movement of the compensator a zero setting of the compensator is obtained as shown in FIG. 2, the lower set of fringes representing the null fringe pattern. FIG. 3 shows a typical fringe pattern (upper pattern) displaced from the null fringe pattern (lower pattern). Realignment of the fringes upon introduction of an unknown material into the unknown cell thereafter requires a certain movement of the compensator which can be measured. By appropriate calibration of the compensator the refractive index, thickness or concentration of the unknown can be read directly.

Other interferometers such as the Jamin, the Twyman-Green, the Williams, the Michelson and the Mach-Zehnder interferometers generally operate upon the same principles.

Compensators in general have taken various forms including tiltable glass plates or sliding glass wedge elements which can be used to vary the path length of the light beam through the limb of the interferometer in which the movable element is located. In each case a similar fixed glass plate is placed in the other limb of the interferometer.

However, use of any of the known compensators may result in a chromatic aberration in the resulting fringe pattern if the refractive dispersion of the compensator does not match that of the material being studied. The refractive dispersion is the dependence of refractive index upon wave-length. This aberration makes alignment of the fringe pattern with the null fringe pattern difficult because of the uncertainty in identifying and locating the "zero order" fringe due to anomalous shifting of this fringe. This observed anomalous fringe shift is characteristic of the difference in refractive dispersion between the two limbs of the interferometer which manifests itself as a discontinuity in compensator travel necessary to rematch the null pattern with respect to path-length difference. These observed discontinuities are shown for solutions of lithium bromide and sucrose in FIG. 4 wherein compensator travel is plotted as micrometer drum reading and path-length difference is plotted as percent of solute. Each point of discontinuity causes a serious uncertainty in the identification of the "zero order" fringe. In a technique where differences on the order of a thousandth of a fringe can otherwise accurately be measured this defect has prevented the full realization of the potential of interferometry as a measuring means.

SUMMARY OF THE INVENTION

In accordance with the present invention an aberration-free compensator for use in white light interferometry which eliminates the observed discontinuities described above is provided. This compensator balances the path lengths of the two limbs of the interferometer in such a way as to make the "zero order" fringe easily and accurately identifiable. In the prior art it has been suggested that a collection of compensation plates having various refractive dispersions matched to the dispersion of the material being studied could be used for this purpose. L. H. Adams, J. Am. Chem. Soc. 37, 1181 (1915); L.H. Adams, J. Wash. Acad. 5, 276 (1915). However, implementation of this suggestion would require the availability of an impractically large number of different yet optically matched pairs of plates of high optical perfection and would entail almost endless disassembly, reassembly, realignment and calibration of the interferometer involved. The improved compensator of this invention accomplishes the desired result by in effect utilizing a variable thickness of a fluid medium having a refractive dispersion which is substantially identical to that of the material being studied in the interferometer. Such fluid medium may be a solution having a refractive dispersion which is the same as that of the reference or unknown material or within the range between that of the reference material and unknown material. One convenient way of accomplishing the desired result is to use the reference material itself. Utilization of the improved compensator of this invention thus permits realization of the long recognized advantages of white light interferometry in differential refractometry which heretofore could not be realized because of the difficulty and uncertainty in identifying the "zero order" fringe.

Various features of the invention will be illustrated and explained in the following description of the drawing and the description of the preferred embodiments.

BRIEF DESCRIPTION OF THE DRAWING

In the accompanying drawing like numerals are employed to designate like parts.

DESCRIPTION OF THE PREFERRED EMBODIMENTS

Figure 1:
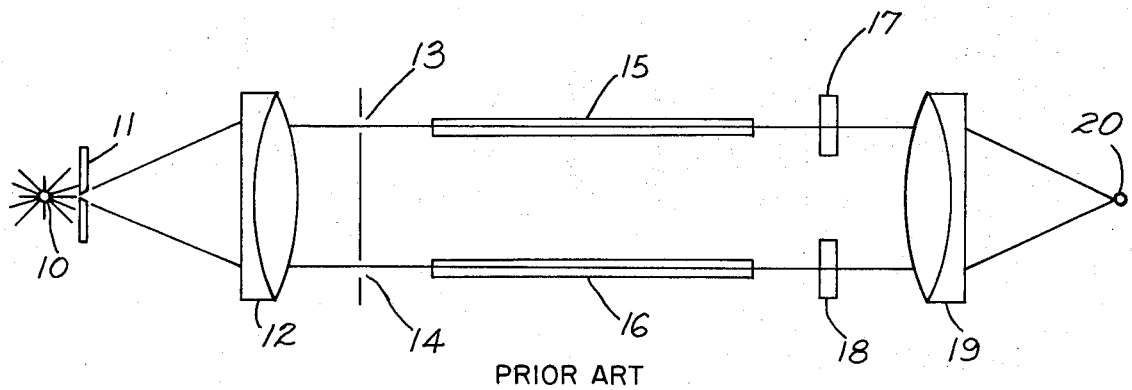
FIG. 1, described above, is a schematic plan view of a Rayleigh interferometer.
Figure 2:
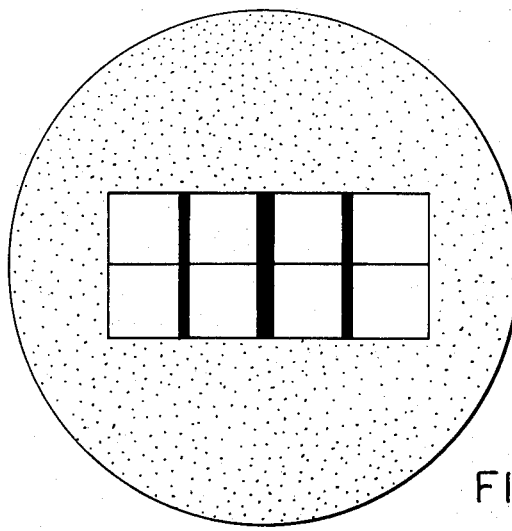
FIG. 2, described above, is a diagrammatic view of a typical fringe pattern (upper pattern) aligned with a null fringe pattern (lower pattern)
Figure 3:
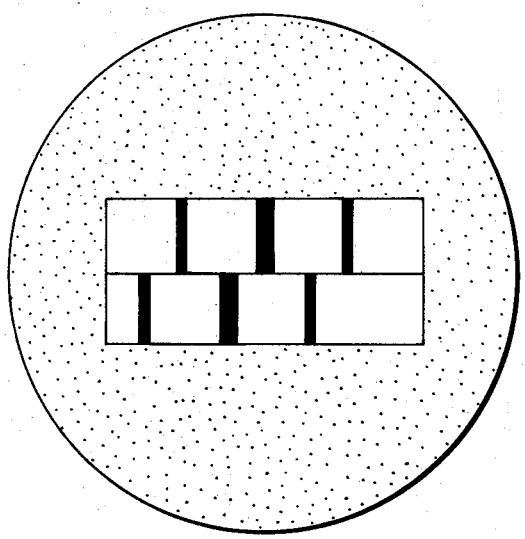
FIG. 3, described above, is a diagrammatic view of a typical fringe pattern (upper pattern) displaced from a null fringe pattern (lower pattern)
Figure 4:
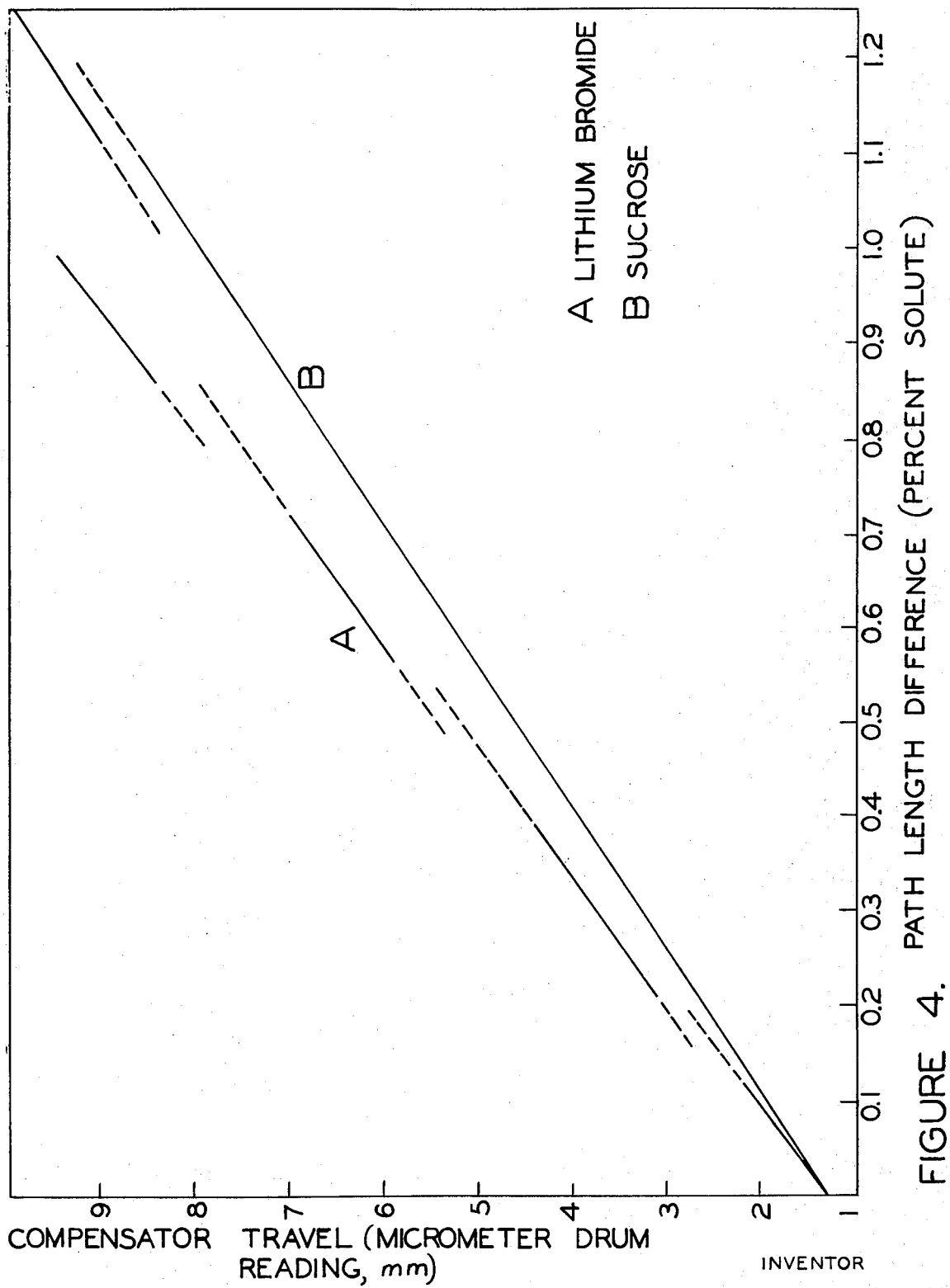
FIG. 4, described above, is a graph showing compensator travel plotted against path length difference.
Figure 5:
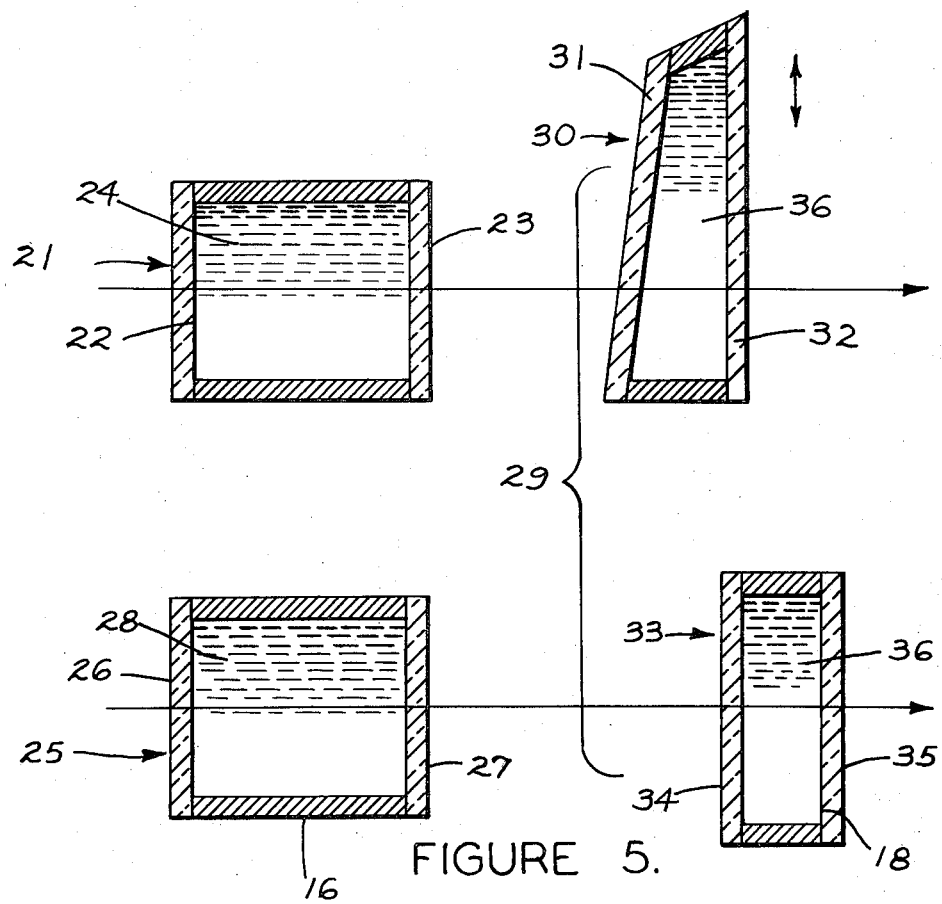
FIG. 5 is a plan view of one embodiment of the present invention.

Referring to FIG. 5 a calibrated wedge compensator is shown schematically in an interferometer in which in one limb cell 21 having transparent windows 22 and 23 contains a reference material 24 and cell 25 in the other limb having transparent windows 26 and 27 contains unknown material 28. Compensator assembly 29 consists of compensator elements 30 and 33. Compensator element 30 has transparent windows 31 and 32 and compensator element 33 has transparent windows 34 and 35. Both compensator elements 30 and 33 contain a material 36 which has a refractive dispersion approximating that of reference material 24 and unknown 28. Preferably if reference material 24 and unknown 28 are liquid solutions then material 36 should also be a liquid solution. Compensator element 30 is wedge shaped and adapted to slide in the direction shown by the double-headed arrow so as to present a lower or shorter light path through material 36 in that limb compared to the light path through material 36 in the other limb of the interferometer. Compensator element 33 is fixed in position and presents a constant light path length through material 36. Both compensator elements 30 and 33 are adapted for filling with material 36 by conventional filling means (not shown) and may be connected and/or agitated to assure identity and uniformity of the materials therein.

Figure 6:
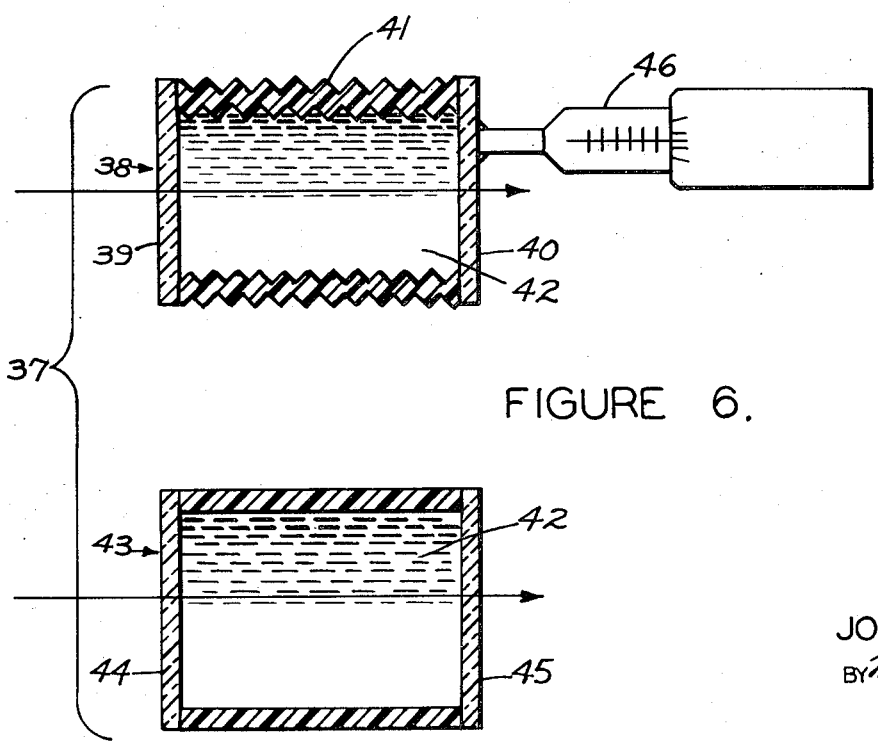
FIG. 6 is a plan view of another embodiment of the invention.

FIG. 6 illustrates another embodiment of a compensator in which variation in path length is achieved by use of a bellows arrangement. Compensator assembly 37 consists of compensator elements 38 and 43. Compensator element 38 has transparent windows 39 and 40 and bellows 41. Compensator element 43 has transparent windows 44 and 45. Both compensator elements 38 and 43 contain material 42 which approximates the reference material and unknown material in refractive dispersion. Compensator element 38 is fitted with an appropriate micrometer means 46 so that very small expansions or contractions of bellows 41 can be facilitated. Compensator element 43 is fixed in position. Both compensator elements 38 and 43 include conventional filling means (not shown) and may be connected and/or agitated to assure identity and uniformity of the materials therein. In the operation of this embodiment the path length through compensator element 38 is varied by expansion and contraction of bellows 41.

Figure 7:
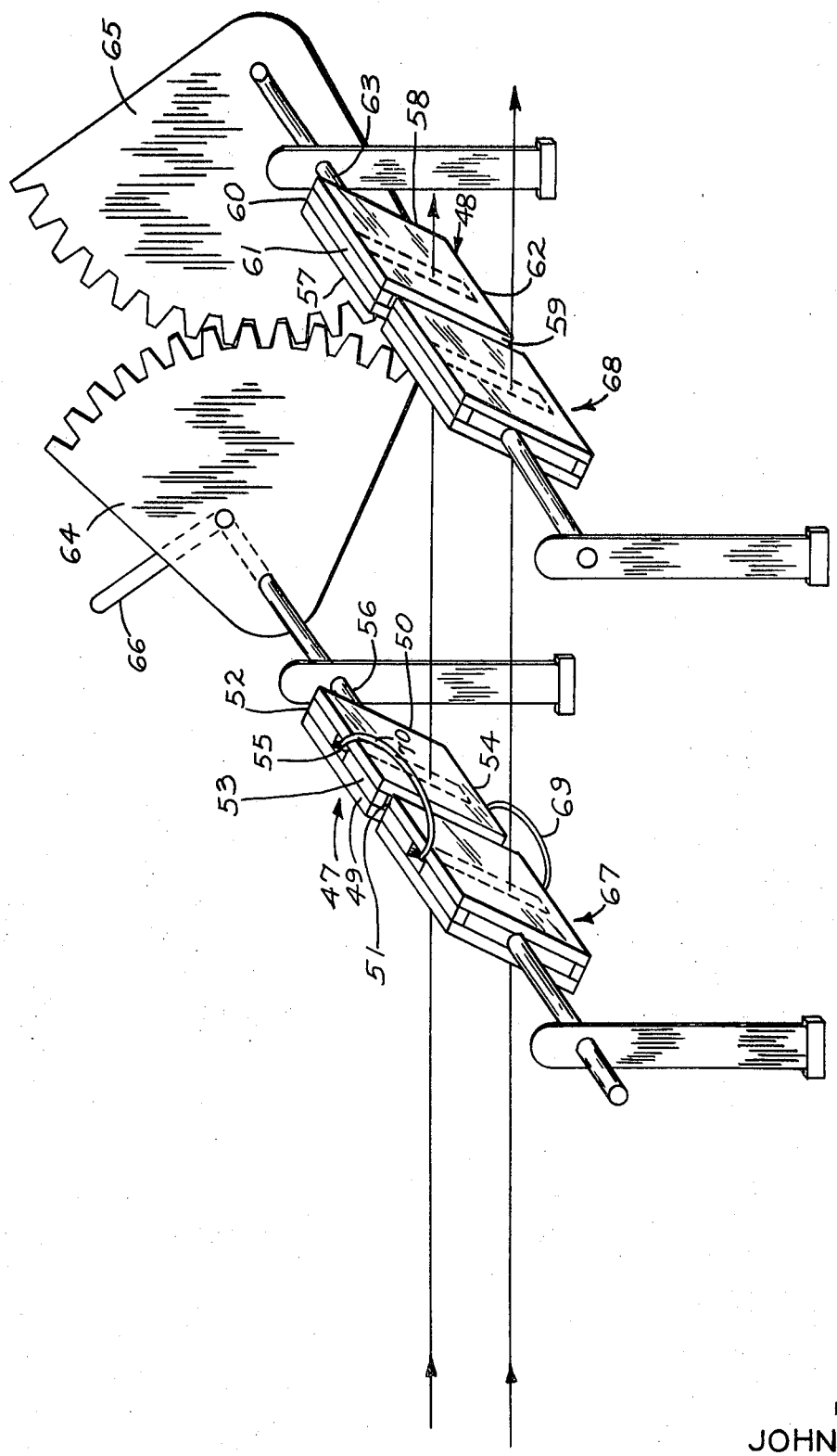
FIG. 7 is a perspective view of another embodiment of the invention.

FIG. 7 illustrates another embodiment of the compensator of this invention which involves the use of a pair of stacked plate or sandwich constructions in each limb of the interferometer. The sandwiches are normally inclined at an angle of approximately 45° to the optic axis. In one limb are a first sandwich 47 and a second sandwich 48. The first sandwich 47 is defined by first and second ground and polished glass windows 49 and 50, a hollow spacer consisting of sides 51 and 52, top 53 and bottom 54. Top 53 is fitted with a closure means 55 so that sandwich 47 can be filled with a material having a refractive dispersion approximating that of the reference and unknown materials. Sandwich 47 is mounted on a rotatable shaft 56 which can be rotated about an axis perpendicular to the optic axis of the interferometer. The second sandwich 48 operates in conjunction with first sandwich 47 and is defined by first and second ground and polished glass windows 57 and 58, a hollow spacer consisting of sides 59 and 60, top 61 and bottom 62. Sandwich 48 is left unfilled in the operation of the compensator. Sandwich 48 is mounted on a rotatable shaft 63 which can be rotated about an axis perpendicular to the optic axis of the interferometer. Shaft 56 is attached to non-slip anti-backlash gear 64 which is coupled to non-slip anti-backlash gear 65 attached to shaft 63. Arm 66 is attached to the end of shaft 56 and serves to rotate gears 64 and 65. Arm 66 may be equipped with a micrometer drive (not shown) to facilitate measurements with the compensator. A second set of sandwiches 67 and 68 identical to sandwiches 47 and 48 is positioned at a fixed angle, usually about 45°, to the optic axis in the other limb of the interferometer. Sandwich 67 is filled with the same material as sandwich 47 and sandwich 68 is unfilled as sandwich 48. In order to insure uniformity of material in sandwiches 47 and 67 tubes 69 and 70 flexibly connecting sandwiches 47 and 67 are used so that circulation of filling fluid may be accomplished as necessary.

Movement of arm 66 causes shaft 56 to rotate sandwich 47 about an axis perpendicular to the optic axis. If the resting position of sandwiches 47 and 48 is assumed to be at an angle of 45° to the optic axis a rotation of arm 66 through an angle $\theta$ in the clockwise direction as shown will cause sandwich 47 to assume an angle of 45° $+ \theta$ with the optic axis. The coupling of gears 64 and 65 will then cause shaft 63 to rotate through an angle $\theta$ in a counterclockwise direction and sandwich 48 will assume an angle with the optic axis of 45° $-\theta$. Thus, while windows 49 and 50 of sandwich 47 will become effectively thinner, windows 57 and 58 of sandwich 48 will become equally effectively thicker and there will be no net change in glass thickness and no contribution of the windows to the compensation of the light path through that limb. The compensator therefore operates as if only a suspended plate of material approximating the refractive dispersion of the reference and unknown materials were being used to compensate for the difference in refractive index between the reference and unknown materials.

Although it is possible to utilize the movable compensator element of any of the designs described above or equivalents thereof in either the reference or the unknown limb of the interferometer it is preferred to utilize the movable element in the reference limb. In this way a parallel path change mode is effected, that is, if the refractometric path is lengthened, the compensator path in the opposite limb should be lengthened rather than shortening the compensator path in the same limb as the refractometric path lengthening. This follows from the fact that glass and solution are less disparate in refractive dispersion than are air and solution and obeys the optical principle that in interferometers which are required to show fringes in white light, the interfering waves should be arranged to have as far as possible equal paths in media of identical dispersion.

What is claimed is:

1. In a white light interferometer comprising a test limb containing an unknown material in the light path thereof and a reference limb containing a reference material in the light path thereof, a compensator which comprises a first container in said test limb and a second container in said reference limb, each of said first and second containers having transparent faces in said light paths and containing a fluid medium having a refractive dispersion which is substantially identical to that of said unknown material, said first container providing a constant thickness of said fluid medium in the light path through said test limb, and said second container being movable within the light path through said reference limb to provide a varying thickness of said fluid medium therein.

2. A compensator according to claim 1 wherein said fluid medium has a refractive dispersion which is the same as that of said reference material.

3. A compensator according to claim 1 wherein said fluid medium has a refractive dispersion which is the same as that of said unknown material.

4. A compensator according to claim 1 wherein said fluid medium has a refractive dispersion within the range between that of said reference material and that of said unknown material.

5. A compensator according to claim 1 wherein said second container is wedge shaped.

6. A compensator according to claim 1 wherein said second container is equipped with bellows which expand or contract said container in a direction parallel to the light path in said reference limb.

7. In a white light interferometer comprising a test limb containing an unknown material in the light path thereof and a reference limb containing a reference material in the light path thereof, a compensator which comprises a first pair of transparent-faced fillable sandwiches inclined at a fixed angle to the optic axis in said test limb, one of said first pair of sandwiches being empty, the other of said pair being filled with a fluid medium having a refractive dispersion which is substantially identical to that of said unknown material, and a second pair of transparent-faced fillable sandwiches rotatable about an axis perpendicular to the optic axis in said reference limb, one of said second pair of sandwiches being empty, the other of said second pair being filled with said fluid medium, one of said second pair of sandwiches, upon rotation of the other of said second pair of sandwiches, rotating an equal amount but in the opposite direction thereof.

* * * * *